(12) United States Patent
Herges et al.

(10) Patent No.: US 8,302,930 B2
(45) Date of Patent: Nov. 6, 2012

(54) DEVICE FOR THE CONTROLLED OPERATION OF A SWITCHING ELEMENT, IN PARTICULAR OF A VALVE AND ACTUATOR FOR USE IN AUTOMOTIVE ENGINEERING

(75) Inventors: Michael Herges, Munich (DE); Friedbert Roether, Cleebronn (DE); Martin Mederer, Munich (DE); Janos Toth, Kecskemét (HU)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 432 days.

(21) Appl. No.: 12/449,430

(22) PCT Filed: Feb. 7, 2008

(86) PCT No.: PCT/EP2008/000935
§ 371 (c)(1),
(2), (4) Date: Jan. 15, 2010

(87) PCT Pub. No.: WO2008/095701
PCT Pub. Date: Aug. 14, 2008

(65) Prior Publication Data
US 2010/0139783 A1  Jun. 10, 2010

(30) Foreign Application Priority Data
Feb. 7, 2007 (DE) .................. 10 2007 005 981

(51) Int. Cl.
*F16K 31/00* (2006.01)
(52) U.S. Cl. ............ 251/11; 251/90; 251/113; 251/297; 60/527

(58) Field of Classification Search .............. 251/11, 251/89–116, 297; 60/527, 528, 530, 531; 236/42, 43, 86, 87, 95, 96, 99 R
See application file for complete search history.

(56) References Cited

U.S. PATENT DOCUMENTS

| | | | | |
|---|---|---|---|---|
| 3,386,065 A | * | 5/1968 | Algino | 337/315 |
| 4,187,683 A | * | 2/1980 | Northrop et al. | 60/527 |
| 4,337,621 A | * | 7/1982 | Lane et al. | 60/527 |
| 4,346,558 A | * | 8/1982 | Bernett | 60/527 |
| 4,666,081 A | * | 5/1987 | Cook et al. | 236/68 R |

(Continued)

FOREIGN PATENT DOCUMENTS
DE   26 23 235    4/1978
(Continued)

OTHER PUBLICATIONS

European Patent Office, International Preliminary Report on Patentability, Aug. 20, 2009, from International Patent Application No. PCT/EP2008/000935, filed on Feb. 2, 2008.

(Continued)

*Primary Examiner* — Eric Keasel
(74) *Attorney, Agent, or Firm* — Kenyon & Kenyon LLP (57) ABSTRACT

An actuator having a linearly movable push rod for use in automotive engineering, which may be for operating a switching element of a valve, in particular a container control valve of a commercial vehicle, having a housing having an expandable material working element and an electrical heater for heating the expandable material working element. Furthermore, a device is provided for the controlled operation of a switching element of a valve, in particular a container control valve of a commercial vehicle, which includes an actuator of the aforementioned kind.

30 Claims, 6 Drawing Sheets

U.S. PATENT DOCUMENTS

| | | | | |
|---|---|---|---|---|
| 4,848,389 A | * | 7/1989 | Pirkle | 137/80 |
| 4,883,082 A | * | 11/1989 | Pirkle | 251/11 |
| 5,033,865 A | * | 7/1991 | Kuze | 374/160 |
| 5,482,010 A | * | 1/1996 | Lemberger et al. | 123/41.1 |
| 5,799,625 A | | 9/1998 | Ziolek et al. | |
| 5,971,288 A | * | 10/1999 | Davis et al. | 236/68 R |
| 6,742,716 B1 | * | 6/2004 | Duprez et al. | 236/34.5 |

FOREIGN PATENT DOCUMENTS

| | | |
|---|---|---|
| DE | 33 44 022 | 11/1989 |
| DE | 41 20 824 | 6/1992 |
| DE | 199 13 380 | 5/2000 |
| EP | 1 132 590 | 9/2001 |
| FR | 2 147 500 | 3/1973 |
| GB | 1 003 077 | 9/1965 |
| WO | 02/086646 | 10/2002 |

OTHER PUBLICATIONS

European Patent Office, Translation of International Preliminary Report on Patentability, Aug. 20, 2009, from International Patent Application No. PCT/EP2008/000935, filed on Feb. 2, 2008.

* cited by examiner

DEVICE FOR THE CONTROLLED OPERATION OF A SWITCHING ELEMENT, IN PARTICULAR OF A VALVE AND ACTUATOR FOR USE IN AUTOMOTIVE ENGINEERING

FIELD OF THE INVENTION

The present invention relates to an actuator for use in automotive engineering and a device for the controlled operation of a switching element, in particular of a valve, which may be of a container switch valve of a commercial vehicle.

BACKGROUND INFORMATION

A purely mechanically operable container control valve is discussed in German patent document DE 26 23 235.

On the basis of this related art, a control valve was provided in DE 41 20 824 C1, which is operable pneumatically and/or mechanically, compressed air being applied to a control piston in order to achieve the drive position, which control piston brings a switching element into the drive position.

By contrast, DE 33 44 022 provided for the use of solenoid valves designed to shift a slider of a control valve pneumatically between different positions. To be sure, a manual lever may be used to select between the different switching positions for controlling the air suspension system. The solenoid valves, however, are controlled purely electrically, while the actual control and movement of the slider occurs pneumatically.

German patent document DE 199 13 380 C1 of the species discusses a device for the controlled operation of a switching element of a valve, which has a spring sliding the switching automatically from a first functional position into a safety position, which on one end of the switching element acts against the locking force of a lock having a locking ball, whose locking force is variable by controlling a solenoid valve, the solenoid valve being used to apply compressed air to a control piston of the lock.

This device has proven itself, to be sure, but it has the disadvantage that a pneumatic control of the control piston of the control valve is still indispensible.

SUMMARY OF THE INVENTION

By contrast, the exemplary embodiments and/or exemplary methods of the present invention has the objective of pursuing another route, which is to dispense with a pneumatic control entirely.

The exemplary embodiments and/or exemplary methods of the present invention achieves this objective by the subject matter described herein.

The electrical heater makes the expandable material element electrically controllable or activatable and increases the operating speed of the expandable material element in such a way that the actuator is able to be used in the motor vehicle sector, in particular in less time-critical applications such as in the area of the operation of container control valves and the like. It is particularly suitable for less time-critical applications and is particularly suitable for applying forces of up to 1000 N, which may be 100 N to 1000 N, as well as for implementing an actuator travel of more than 1 mm, in particular more than 5 mm, which may be more than 10 mm.

The exemplary embodiments and/or exemplary methods of the present invention accordingly also provides a device for the controlled operation of a switching element, in particular a valve, which may be a container control valve of a commercial vehicle having an actuator of that kind.

The exemplary embodiments and/or exemplary methods of the present invention thus provides a device for the controlled operation of a switching element of a valve, which makes it possible to dispense entirely with the use of compressed air as a control medium for operating the switching element or a control piston associated with the latter.

In particular, a device is provided for the controlled operation of a switching element of a valve, in particular of a container control valve of a commercial vehicle, having a pressure system, in particular a spring, that moves the switching element automatically from a first operating position to a second operating position, which has an actuator of the inventive kind.

For this purpose it is expedient if the pressure system includes the actuator in addition to the spring.

Alternatively, an arresting device for the pressure system may include the actuator.

In both variants it is possible in a simple manner to dispense with the use of a fluid, in particular compressed air, for the purpose of effecting control.

Figure 8:
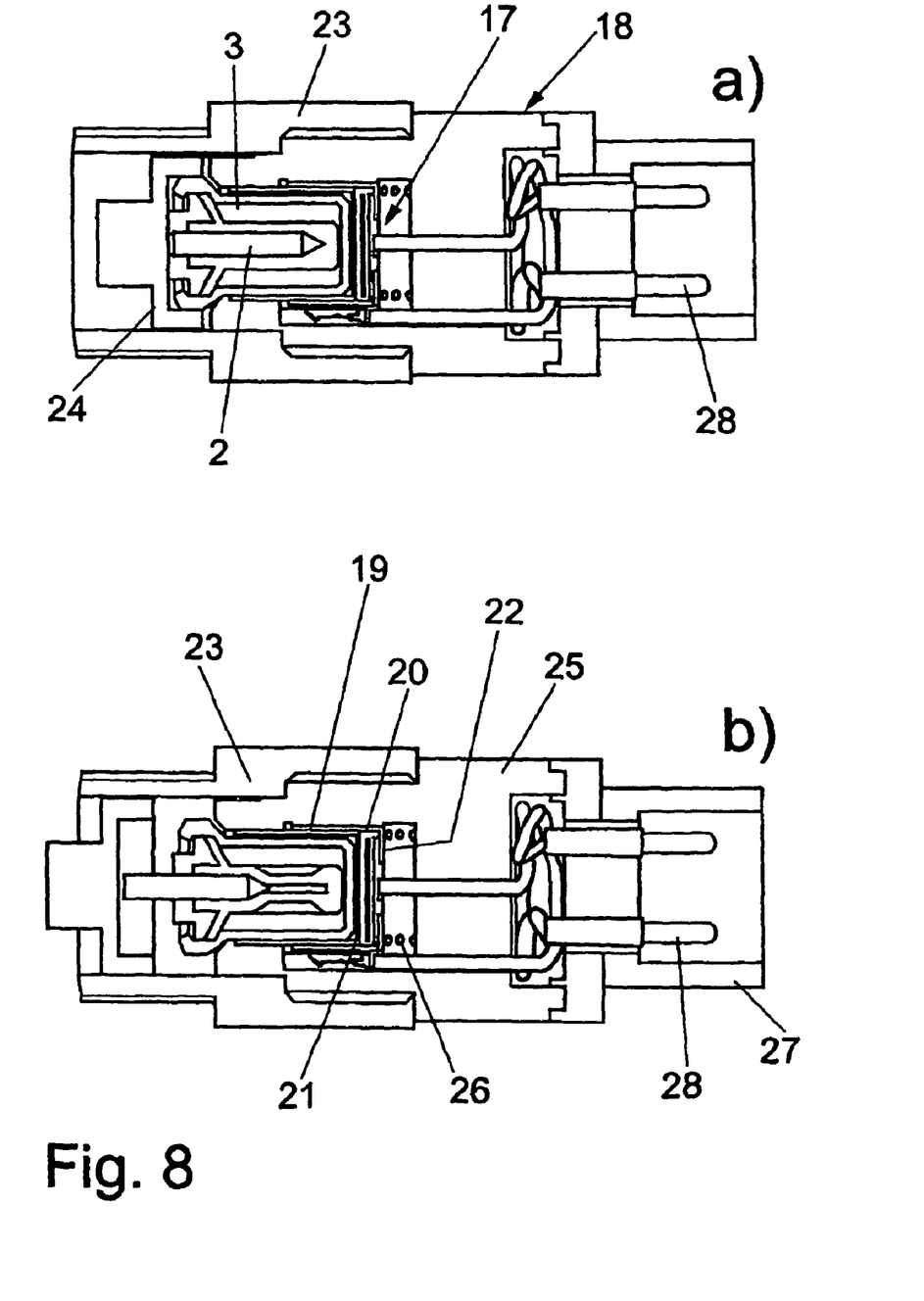
FIGS. 8a, 8b show an actuator of the kind shown in FIG. 1, which is installed into an overall housing.

In the exemplary embodiments of FIGS. 8 and 9, an electromechanically or electromagnetically operated actuator may also be used as an actuator. The actuator would simply have to be replaced by an appropriate electromagnetic or electromotive actuator. In this invention as well, the use of control air may be dispensed with (not shown).

The exemplary embodiments and/or exemplary methods of the present invention thus also creates the subject matter further described herein.

This also creates a device for the controlled operation of a switching element of a valve, in particular of a container control valve of a commercial vehicle, having a pressure system including a spring, which pressure system moves the switching element automatically from a first operating position into a second operating position, the pressure system having, in addition to the spring, an actuator having a push rod movable in linear fashion, and the pressure system acting against the locking force of an arresting device developed as a lock, and the lock having a locking body, which in one operating position of the switching element is pressed by a spring into the recess, in particular a groove, the spring being situated between the one end of the switching element and—possibly via intermediate elements such as a piston—the push rod of the actuator (not shown here).

For this purpose, it is advantageous if the locking force of the lock and the spring acting on the switching element are designed and adjusted to each other in such a way that the spring is not able to release the locking body from its catch in the groove when the actuator is deactivated and that the actuator pushes the locking body from the recess by the spring when the push rod is moved out.

Advantageous developments are also further described herein.

The exemplary embodiments and/or exemplary methods of the present invention is described in more detail below on the basis of an exemplary embodiment with reference to the drawing.

DETAILED DESCRIPTION

Figure 1:
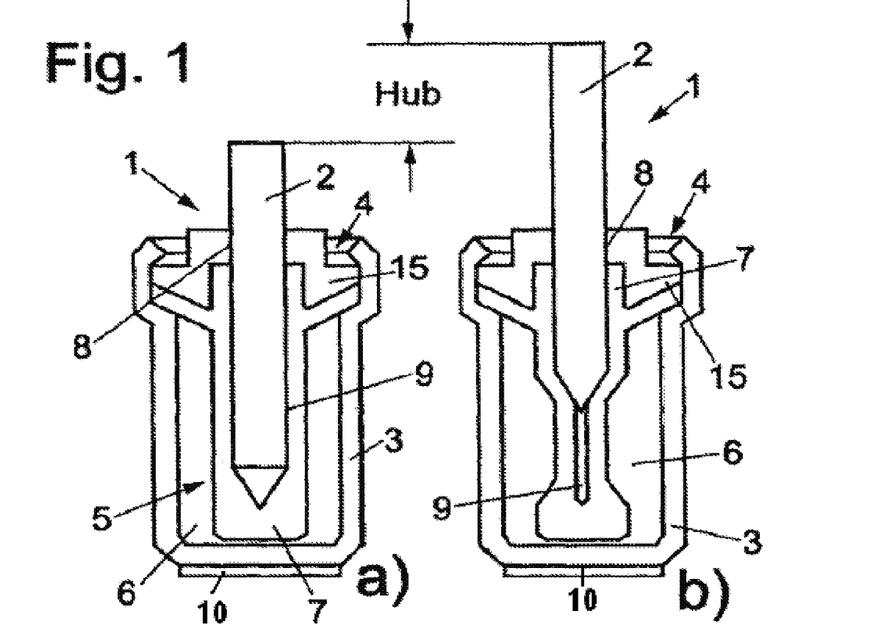
FIGS. 1a, 1b shows a first exemplary embodiment of an actuator according to the present invention in two different operating states.

FIG. 1 shows an actuator 1 having an operating element that is movable in linear fashion, in particular a push rod 2 movable in linear fashion, which is designed for use in automotive engineering and may be used for example for operating a switching element of a valve of a commercial vehicle.

The actuator has a pot-shaped housing 3, which has an open side 4, from which push rod 2 protrudes to the outside.

An expandable material working element 5 is inserted in housing 3.

According to FIG. 1, expandable material working element 5 has an expandable material 6, which is filled into housing 3 and which surrounds an elastomer insert 7.

A cap 15 closes housing 3 except for an opening 8 for the passage of push rod 2 on its open side 4.

Elastomer insert 7 has an, in this case, blind hole-like opening 9, which is aligned with opening 8 of cap 15.

Push rod 2 penetrates opening 8 of cap 15 and engages into opening 9 of elastomer insert 7, in which it is shiftable.

An electrical heater 10 is used to warm or heat expandable material 6, which increases its volume as a result of heating. The increase in volume results in a displacement of elastomer insert 7, which causes push rod 2 to be driven linearly out of housing 3. The achievable work travel may be seen schematically by comparing FIGS. 1a and 1b.

Figure 2:
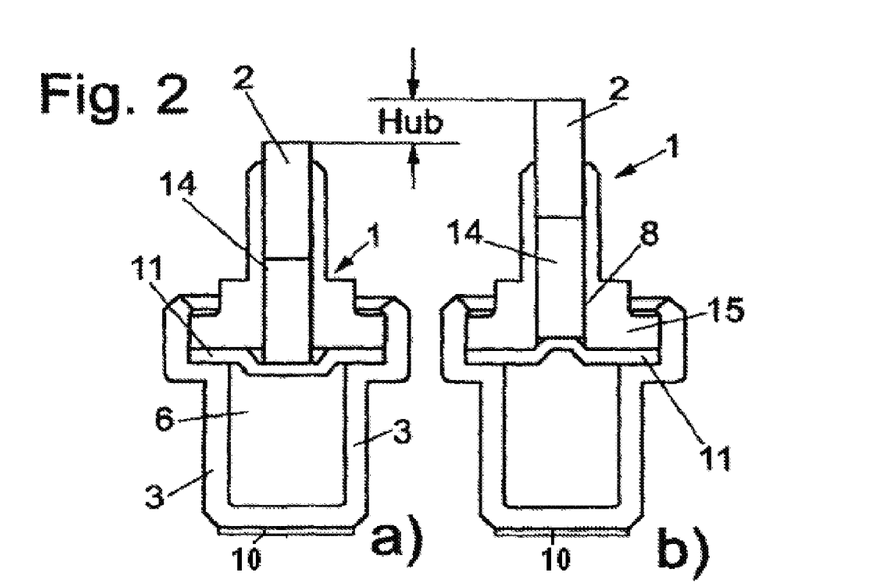
FIGS. 2a, 2b show a second exemplary embodiment of an actuator according to the present invention in two different operating states.

The exemplary embodiment of FIG. 2 differs from the exemplary embodiment of FIG. 1 in that the push rod rests directly or via a transmission element 14 on a diaphragm 11, which is situated below cap 15 having opening 8 for the passage of push rod 2. Cap 15 has a shoulder 16 for guiding push rod 2 and, if applicable, transmission element 14.

Electrical heater 10 is used again to warm or heat expandable material 6, which increases its volume as a result of heating. The increase in volume results in a displacement of diaphragm 11 into the region of opening 8 into cap/plug 15, which in turn results in push rod 2 being shifted out of housing 3. The achievable work travel may be increased by transmission element 14.

Figures 3, 4, 5:
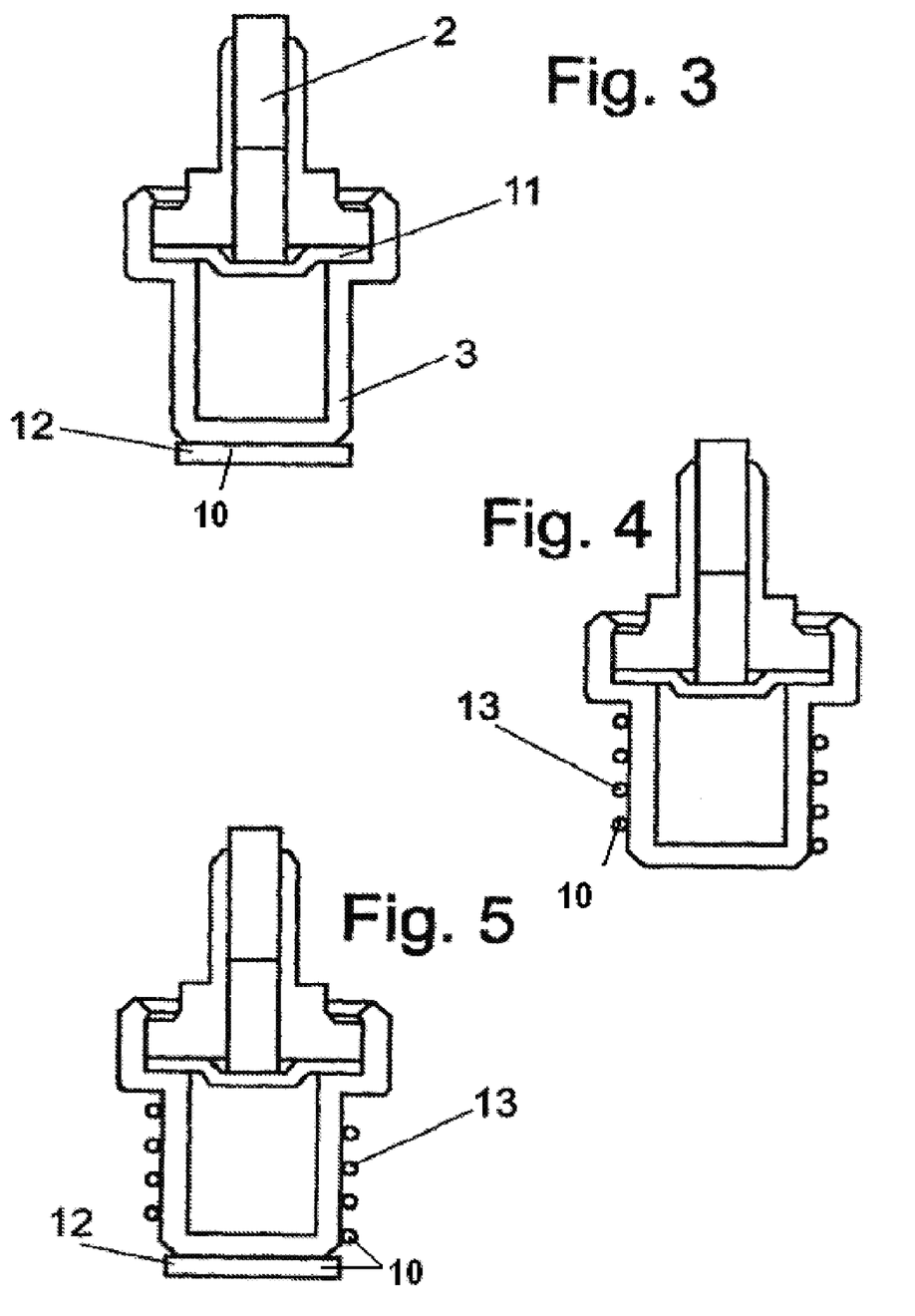
FIGS. 3, 4 5 show variants of the actuator from FIG. 2.

The heater may be constructed on the basis of a thermistor or PTC resistor, which is designed to heat the housing 3 (which may be metallic). An embodiment in the manner of a heating plate 12 lends itself for this purpose, the heating plate being attached to housing 3 or being integrated into it (FIG. 3). Other embodiments, e.g. as a jacket-like heating element (not shown here), are also conceivable.

The heater may also have a heating wire 13, which is wound around the housing, for example, or is integrated into it (FIG. 4). A design as an induction heater is also conceivable.

The heater may also be made up of an advantageous combination of the PTC heater—e.g. heating plate 12—and heating wire 13. Such a variant is shown in FIG. 5.

When cooling down, expandable material 6 contracts again and push rod 2 may be moved back into the starting position (FIGS. 1a, 2a), for example by the counterforce of a spring or the like (not shown here).

Push rod 2 may be used for example for arresting a switching element of a container control valve and may be used as a lock, which replaces a lock of the kind shown in DE 199 13 380 C1 in such a way that a compressed air control of the lock is no longer required. Other areas of use are lifting axle valves or controlling a reset-to-ride function.

Figure 6:
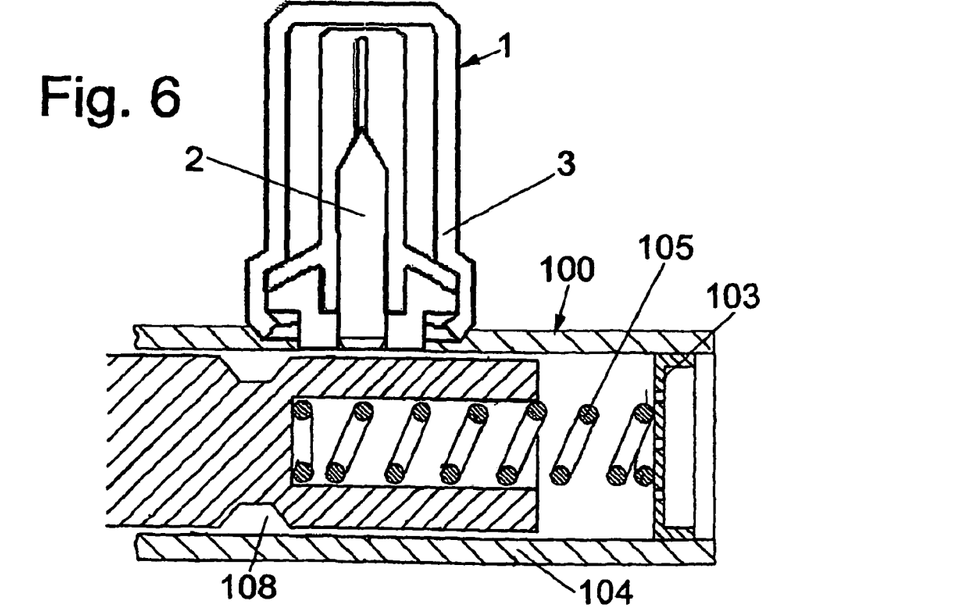
FIGS. 6 and 7 show a device for the controlled operation of a switching element of a valve in two different operating states.
Figure 7:
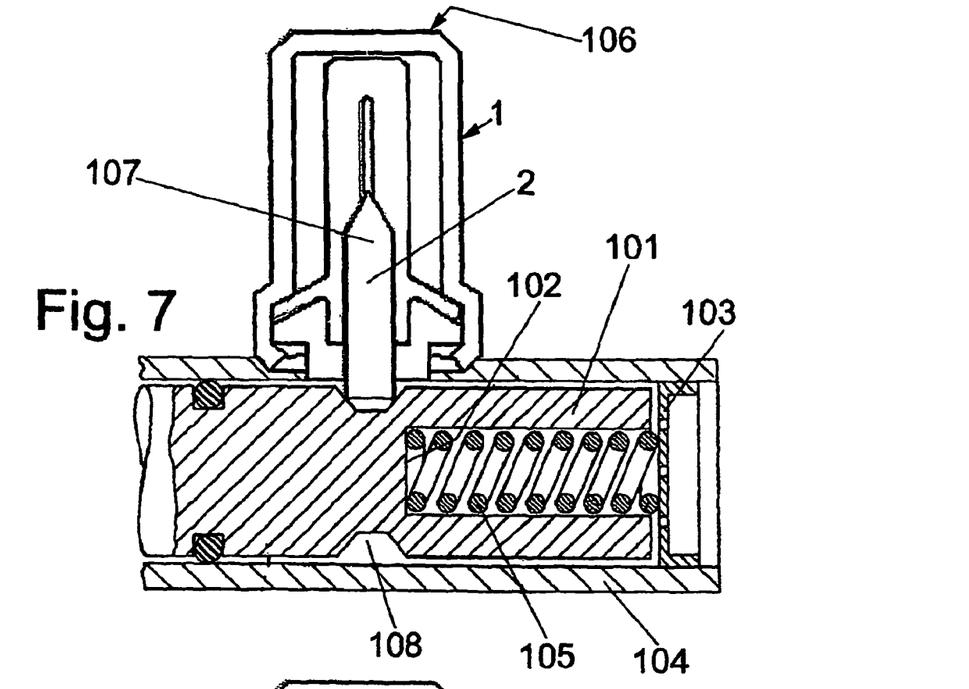

FIGS. 6 and 7 show a lock for a switching element of a valve, in particular of a container control valve.

FIG. 6 shows an end region of a switching element 100, which forms e.g. the switching shaft of a container control valve of the air suspension system of a vehicle.

Switching element 100 may be connected to a manually operable handle, e.g. a switching lever (not shown here), by which switching element 100 may be swiveled and moved axially in order to move it between various switching positions in which e.g. valves are operated (not shown here) in order to control functional elements of the air suspension system in the vehicle in accordance with the desired position (e.g. lifting or lowering).

Switching element 100 is shiftable axially between a "drive" position, in which it is not possible to turn switching element 100, and a "stop" position, in which it is possible to turn switching element 100 around its longitudinal axis. The "stop" position is depicted in FIG. 6, and the "drive" position is depicted in FIG. 7.

In the "stop" position, the positions "lifting" and "lowering" may be achieved e.g. by turning the lever (not shown) to one or the other side such that the air suspension system is controllable in the sense of lifting or lowering the vehicle. This is not possible in the drive position.

Between the one end 102 of switching element 101 and a cover 103 of a housing 104 of the device, a spring 105 is disposed that acts in this case as a compression spring.

Spring 105 is designed in such a way that it presses switching element 101 automatically into the "drive" position of FIG. 7.

From this position, switching element 101 may be moved manually against the force of spring 5 back into the stop position of FIG. 6.

An arresting device 106 in the form of a lock is used to arrest switching element 101 in the stop position.

This arresting device 106 has an actuator 1 of the kind shown in FIG. 1.

Push rod 102 acts as locking body 107 and is designed to engage radially into a recess, in particular a groove 108, on the outer circumference of switching element 101 in a first operating position and is disengaged from the recess in a second operating position (FIG. 6, FIG. 7).

Heating results in push rod 2 being pressed as locking body 107 into groove 108 (FIG. 7).

The stop position is thus locked because the locking force and spring 105 are designed and adjusted to each other in such a way that spring 5 is unable to release locking body 107 from its arrest in groove 108 when heater 10 is activated.

In order to be able to bring the switching element nevertheless into the drive position, the heater is shut off. The expandable material contracts such that spring 105 presses push rod 2 into housing 3 and is able to shift switching shaft 101 into the drive position.

FIGS. 8a and 8b each show an actuator 1 of the kind shown in FIG. 1, which is installed into a cylinder system 17 and a, in this case multi-part, overall housing 18.

Cylinder system 17 has an inner cylinder 19, which accommodates housing 3 and an outer cylinder 20 surrounding inner cylinder 19, which are used, among other things, to contact the heater. Heater 10 in turn is made up of an advantageous combination of heating plate 12, which is situated here between bottom plates 21, 22 of cylinders 19, 20, and heating wire 13 (not shown here).

Actuator 1 with its cylinder system 17 is installed into overall housing 18, which is advantageously designed so as to be able to be mounted on a valve, for example a container control valve (FIG. 9).

The overall housing in this case has a threaded insert 23, which is designed to be screwed onto the housing of the valve to be operated. Threaded insert 23 is cylindrical and designed to accommodate the actuator. A kind of piston 24 is displaceably guided in threaded insert 23 and thus in the overall housing, against which push rod 2 abuts and which is displaceable by push rod 2 in one direction in threaded insert 23.

On its side facing away from piston 24, threaded insert 23 is closed by a cover 25 made of e.g. plastic, a spring 26 being provided between cover 25 and the actuator or its outer cylinder.

The cover is followed by a plug segment 27, which has electrical contacts 28 and which is connectible to the electrical system of a motor vehicle via a corresponding counter plug.

Thus a preassembled actuator unit may be created that is readily mounted on a valve and protects the actuator well.

Analogous to FIG. 6, FIG. 9 again shows an end region of a switching element 100, which forms e.g. the switching shaft of a container control valve of the air suspension system of a vehicle.

Between the one end 102 of switching element 101—a switching shaft—and piston 24 in overall housing 18 of the actuator, spring 105 is disposed in the axial extension of switching shaft 101, which acts here as a compression spring of a pressure system that also includes, according to FIG. 9, actuator 1, which is disposed in the axial extension of spring 105 on the end of the latter facing away from switching element 101 and acts on spring 105 via piston 24. Threaded insert 23 is screwed onto housing 103.

Spring 105 is designed together with actuator 1 in such a way that it is able to press switching element 101 automatically into the "drive" position of FIG. 7 if the driver forgets to do so.

From this position, switching element 101 may be moved manually against the force of spring 105 back into the stop position of FIG. 6.

Figure 9A:
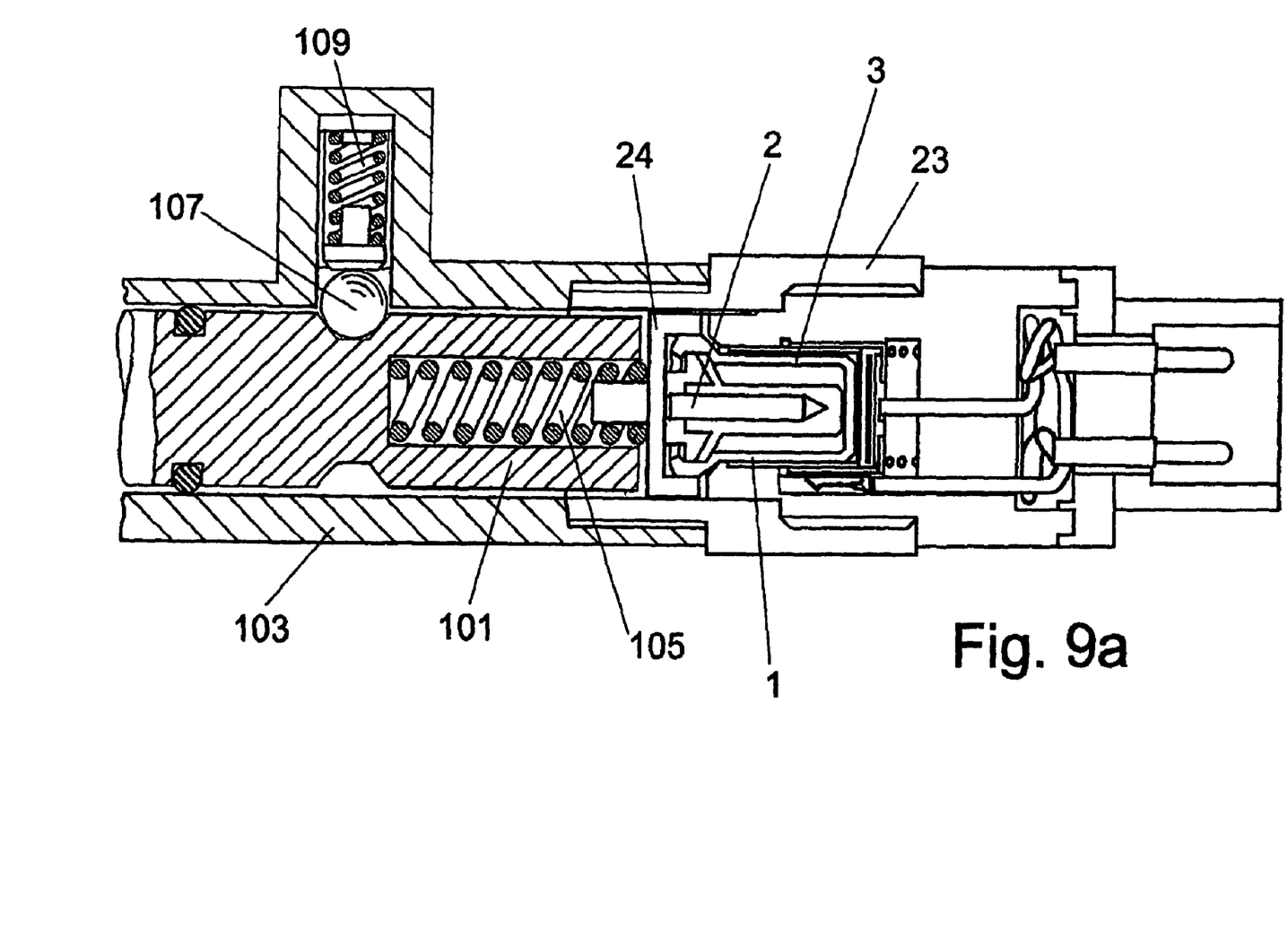
FIGS. 9a, 9b show another device for the controlled operation of a switching element of a valve in two different operating states.
Figure 9B:
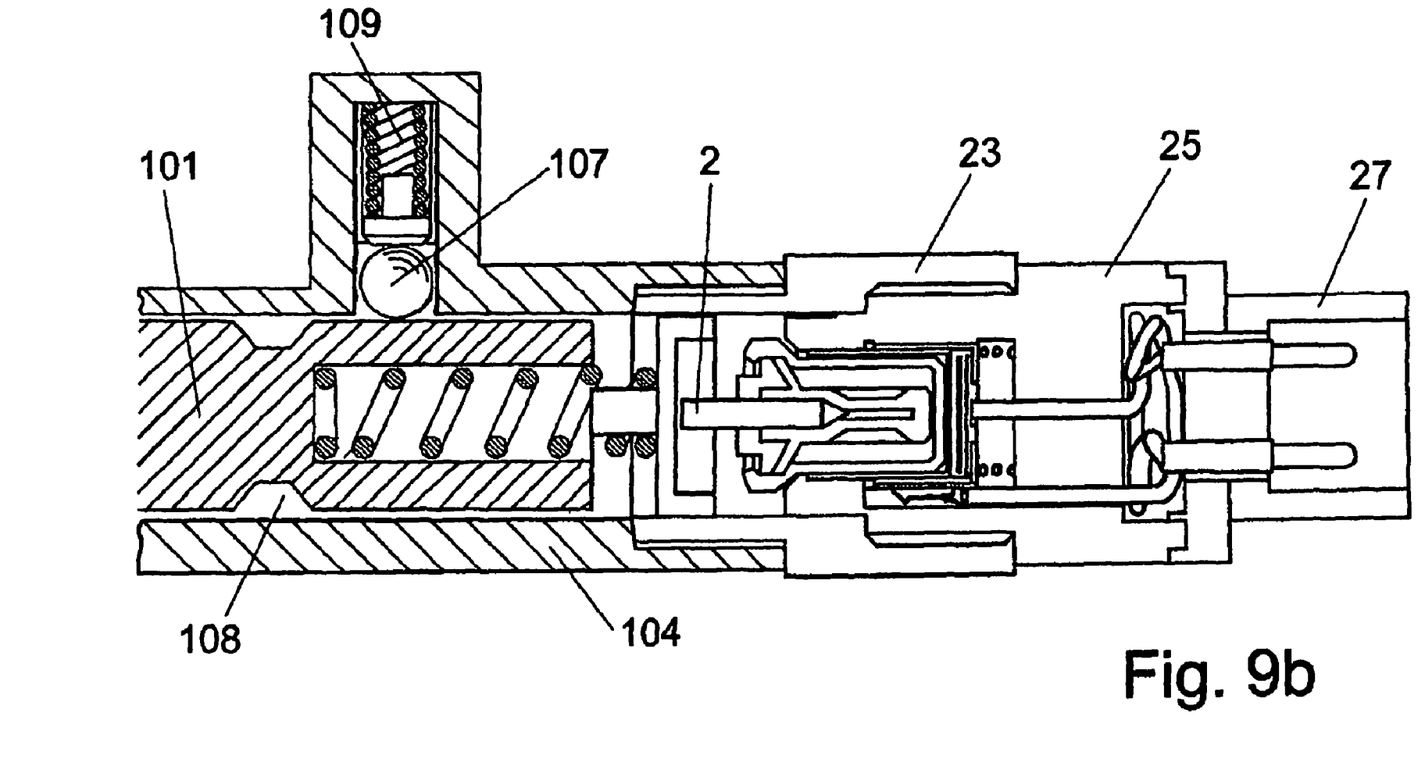

To arrest switching element 101 in the stop position, an arresting device 106 is used, which is developed as a lock, here having a locking body 107—e.g. a ball—that is pressed by a spring 109 into the recess, in particular a groove 108, and in the second operating position—here "drive"—is not engaged with the recess (FIGS. 9a, b) and in the first "stop" operating position is engaged with recess 108.

In the stop position, the actuator is deactivated, i.e., its push rod 2 is pushed into housing 3, which may occur e.g. manually by pressing onto switching element, which presses the piston and thus push rod 2 into housing 3. In this state, locking body 107 engages into recess 108 and spring 105 is unable to press locking body 107 against the force of spring 109 out of recess 108.

The stop position (FIG. 9a) is thus locked because the locking force and spring 105 are designed and adjusted to each other in such a way that spring 5 is unable to release locking body 107 from its arrest in groove 108 when heater 10 is deactivated.

In order to be able to bring the switching element nevertheless specifically into the drive position (FIG. 9b), the heater is switched on such that push rod 2 moves out and the force of the pressure system having spring 105, which acts on the switching element, is increased such that the switching element presses locking body 107 out of recess 108, as a result of which spring 105 is able to push back the switching element—here the switching shaft—further into the drive position.

Pushing the switching shaft back into the stop position and thus also pushing push rod 2 back into its housing 3 is done e.g. manually via a handle that is not shown here.

A particular advantage of these systems is to be seen in the fact that the control air medium and the "control piston" device may be omitted for operating the switching element. The operation occurs rather purely mechanically/electrically. The path known from the related art of using pneumatics for operating a control piston is thus abandoned. It is possible to dispense entirely with the use of compressed air as an aid for the control operation, which in a simple manner reduces manufacturing costs of the control device and increases its reliability.

REFERENCE NUMERALS actuator 1
push rod 2
housing 3
open side 4
expandable material working element 5
expandable material 6
elastomer insert 7
opening 8
opening 9
heater 10
diaphragm 11
heating plate 12
heating wire 13
transmission element 14
cover 15
shoulder 16
cylinder system 17
overall housing 18
cylinder 19, 20
bottom plates 21, 22
threaded insert 23
piston 24
cover 25
spring 26
plug segment 27
contacts 28
switching element 100
end 102
cap 103
housing 104
spring 105
arresting device 106
locking body 107
groove 108
spring 109

What is claimed is:

1. A device for controlling operation of a switching element of a container control valve of a motor vehicle, comprising:
   a switching element, wherein a pressure system, having a spring, moves automatically from a first operating position into a second operating position;

an arresting device having a lock and a locking body, wherein the pressure system acts against a locking force of the arresting device, which in one operating position of the switching element is pressed by the spring into a recess, which is a groove, on an outer circumference of the switching element;

wherein the pressure system has, in addition to the spring, an actuator including a linearly movable push rod, and wherein the spring is situated between one end of the switching element and the push rod of the actuator, and wherein the actuator includes a housing having an expandable material working element and an electrical heater for heating the expandable material working element.

2. The device of claim 1, wherein the locking force of the lock and the spring acting on the switching element are designed and adjusted to each other so that the spring is unable to release the locking body from its arrest in the groove when the heater is deactivated, and wherein the actuator pushes the locking body out of the recess by the spring when the heater is switched on and the push rod is moved out.

3. The device of claim 1, wherein forces of up to 1000 N are applied, and wherein an actuator travel of more than 1 mm is achieved.

4. The device of claim 1, wherein the expandable material working element includes an expandable material, which is fed into the housing, and the housing is closed by a cap, which has an opening that is penetrated by the push rod.

5. The device of claim 1, wherein the push rod in the housing engages into an opening of an elastomer insert.

6. The device of claim 1, wherein the push rod rests directly or via a transmission element in the housing on a diaphragm.

7. The device of claim 1, wherein the heater includes at least one of a heating wire, a PTC resistor element, and an induction heater as the heating element.

8. The device of claim 1, wherein the heater is a heating plate, which is integrated into the housing or attached to it.

9. The device of claim 1, wherein the housing is inserted into a cylinder system.

10. The device of claim 1, wherein the housing together with the cylinder system is inserted into an overall housing.

11. The device of claim 1, wherein the housing has a threaded insert.

12. The device of claim 1, wherein forces of 100 N to 1000 N are applied, and wherein an actuator travel of more than 5 mm is achieved.

13. The device of claim 1, wherein forces of 100 N to 1000 N are applied, and wherein an actuator travel of more than 10 mm is achieved.

14. The device of claim 1, wherein the push rod is pressed into the groove by heating and the spring is unable to release the locking body from its arrest in the recess when the heater is activated.

15. The device of claim 1, wherein the heater is a heating jacket, which is integrated into the housing or attached to it.

16. A device for controlling operation of a switching element of a container control valve of a motor vehicle, comprising:

a switching element, wherein a pressure system, having a spring, moves automatically from a first operating position into a second operating position;

an arresting device having a lock and a locking body, wherein the pressure system acts against a locking force of the arresting device, which in one operating position of the switching element is pressed by the spring into a recess, which is a groove, on an outer circumference of the switching element;

wherein the arresting device includes an actuator having a housing having an expandable material working element and an electrical heater for heating the expandable material working element, wherein the housing is pot-shaped and has an open side, from which the push rod as the locking body protrudes to the outside, and wherein the push rod is pressed into the groove by heating and the spring is unable to release the locking body from its arrest in the recess when the heater is activated.

17. The device of claim 16, wherein the housing is pot-shaped and has an open side, from which the push rod protrudes to the outside.

18. The device of claim 16, wherein the heater is a heating jacket, which is integrated into the housing or attached to it.

19. The device of claim 16, wherein the locking force of the lock and the spring acting on the switching element are designed and adjusted to each other so that the spring is unable to release the locking body from its arrest in the groove when the heater is deactivated, and wherein the actuator pushes the locking body out of the recess by the spring when the heater is switched on and the push rod is moved out.

20. The device of claim 16, wherein forces of up to 1000 N are applied, and wherein an actuator travel of more than 1 mm is achieved.

21. The device of claim 16, wherein the expandable material working element includes an expandable material, which is fed into the housing, and the housing is closed by a cap, which has an opening that is penetrated by the push rod.

22. The device of claim 16, wherein the push rod in the housing engages into an opening of an elastomer insert.

23. The device of claim 16, wherein the push rod rests directly or via a transmission element in the housing on a diaphragm.

24. The device of claim 16, wherein the heater includes at least one of a heating wire, a PTC resistor element, and an induction heater as the heating element.

25. The device of claim 16, wherein the heater is a heating plate, which is integrated into the housing or attached to it.

26. The device of claim 16, wherein the housing is inserted into a cylinder system.

27. The device of claim 16, wherein the housing together with the cylinder system is inserted into an overall housing.

28. The device of claim 16, wherein the housing has a threaded insert.

29. The device of claim 16, wherein forces of 100 N to 1000 N are applied, and wherein an actuator travel of more than 5 mm is achieved.

30. The device of claim 16, wherein forces of 100 N to 1000 N are applied, and wherein an actuator travel of more than 10 mm is achieved.

* * * * *